US012643984B2

(12) United States Patent
Lillebo et al.

(10) Patent No.: US 12,643,984 B2
(45) Date of Patent: Jun. 2, 2026

(54) POLYSILAZANE COATING METHOD AND DEVICE

(71) Applicant: Nanize AS, Narvik (NO)

(72) Inventors: Håvard Lillebo, Ankenes (NO);
Kingsley Odinaka Iwu, Narvik (NO)

(73) Assignee: NANIZE AS, Narvik (NO)

( * ) Notice: Subject to any disclaimer, the term of this patent is extended or adjusted under 35 U.S.C. 154(b) by 537 days.

(21) Appl. No.: 18/013,720

(22) PCT Filed: Jun. 28, 2021

(86) PCT No.: PCT/EP2021/067680
§ 371 (c)(1),
(2) Date: Dec. 29, 2022

(87) PCT Pub. No.: WO2022/002844
PCT Pub. Date: Jan. 6, 2022

(65) Prior Publication Data

US 2023/0235126 A1     Jul. 27, 2023
US 2025/0171593 A9     May 29, 2025

(30) Foreign Application Priority Data

Jul. 2, 2020     (NO) .................................... 20200778

(51) Int. Cl.
*C08G 77/62* (2006.01)
*B01J 8/02* (2006.01)
*C09D 183/16* (2006.01)

(52) U.S. Cl.
CPC ........... *C08G 77/62* (2013.01); *B01J 8/0278* (2013.01); *C09D 183/16* (2013.01); *C08G 2150/00* (2013.01)

(58) Field of Classification Search
CPC .... C08G 77/62; C08G 2150/00; B01J 8/0278; C09D 183/16
See application file for complete search history.

(56) References Cited

U.S. PATENT DOCUMENTS

| | | | |
|---|---|---|---|
| 10,961,354 B1* | 3/2021 | Eckel ...................... | B28B 1/001 |
| 2007/0071903 A1 | 3/2007 | Claar et al. | |
| 2008/0102211 A1* | 5/2008 | Matsuo ................... | C09D 7/20 |
| | | | 585/24 |

(Continued)

FOREIGN PATENT DOCUMENTS

| | | |
|---|---|---|
| JP | 2009040991 A | 2/2009 |
| JP | 2011256370 A | 12/2011 |
| WO | 2015128460 A1 | 9/2015 |

OTHER PUBLICATIONS

P. Furtat et al. Synthesis of fluorine-modified polysilazanes via Si—H bond activation and their application as protective hydrophobic coatings. Journal of Materials Chemistry A, 2017, 5, 25509 (Exhibit 3).

(Continued)

*Primary Examiner* — Shane Fang
(74) *Attorney, Agent, or Firm* — LAW OFFICES OF ALBERT WAI-KIT CHAN, PLLC

(57) ABSTRACT

The present invention relates to the formation of silazane coatings. The invention provides a polysilazane coating method for limiting fragmentation of polysilazane and an assembly for performing said polysilazane coating method for limiting fragmentation of polysilazane.

14 Claims, 4 Drawing Sheets

(56) References Cited

U.S. PATENT DOCUMENTS

| | | |
|---|---|---|
| 2009/0098300 A1 | 4/2009 | Brand et al. |
| 2011/0311401 A1 | 12/2011 | Stauffer |
| 2013/0178595 A1 | 7/2013 | Yang et al. |
| 2013/0345356 A1 | 12/2013 | Bulluck |
| 2015/0376407 A1* | 12/2015 | Joo .......................... C08L 83/00 |
| | | 525/100 |

OTHER PUBLICATIONS

Norwegian Search Report dated Feb. 2, 2022, for Norwegian Application No. 20200778 (filed Jul. 2, 2020) (Exhibit 4).

International Search Report dated Nov. 30, 2021, for International Application No. PCT/EP2021/067680 (filed Jun. 28, 2021) (Exhibit 5).

Written Opinion of the International Search Authority dated Nov. 30, 2021, for International Application No. PCT/EP2021/067680 (filed Jun. 28, 2021) (Exhibit 6).

International Preliminary Report on Patentability dated Sep. 26, 2022, for International Application No. PCT/EP2021/067680 (filed Jun. 28, 2021) (Exhibit 7).

Technical Bulletin 1, KiON Ceraset polyureasilazane and KiON Ceraset polysilazane 20 heat-curable resins of KiON Corporation (publication available Mar. 2009) (Exhibit 8).

Vakifahmetoglu, C. et al.: "Highly porous macro- and micro-cellular ceramics from a polysilazane precursor", Ceramics 7 International 35 (2009) 3281-3290 (Exhibit 9).

Japanese Office Action dated Feb. 4, 2025, Nanize As, for "Polysilazane Coating Method and Device", Japanese Patent Application No. JP2022581578A, filed Jun. 28, 2021.

* cited by examiner

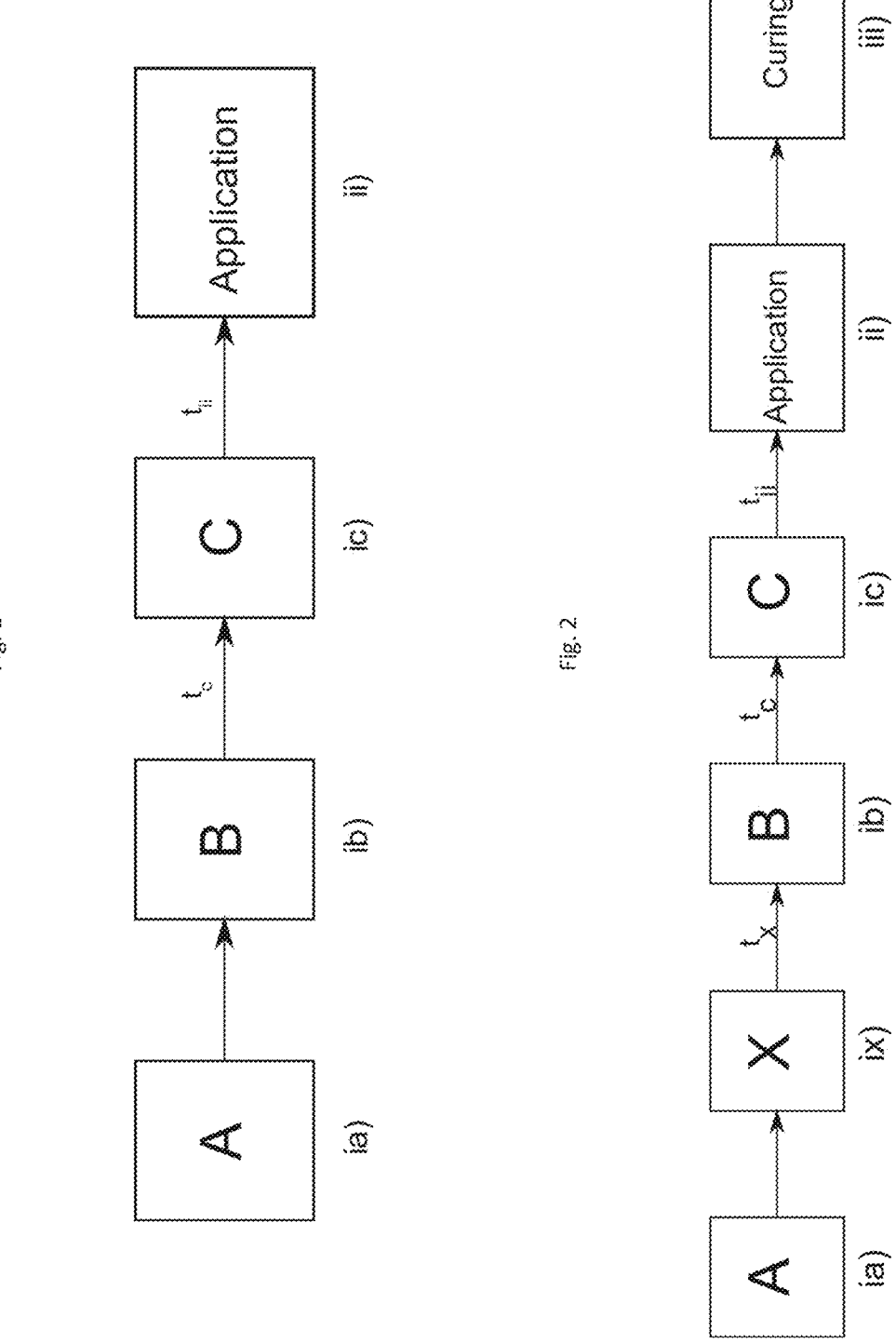

POLYSILAZANE COATING METHOD AND DEVICE

FIELD OF THE INVENTION

The present invention relates to the formation of polysilazane coatings. The invention provides a polysilazane coating method for limiting fragmentation of polysilazane and an assembly for performing said polysilazane coating method for limiting fragmentation of polysilazane.

BACKGROUND OF THE INVENTION

Polysilazanes, a group of polymers characterised by their Si—N—Si backbone, have attracted increasing interest over the recent years for the use in coatings. Depending on the type and formulation of the coating, polysilazane coatings can display a range of favourable properties; the high reactivity of the polysilazanes can result in coatings with e.g. high hardness and weatherability, excellent adhesion properties and scratch and wear resistance, low surface roughness, and high gloss on painted surfaces. Excellent thermal, chemical and UV resistances have been documented. Organic polysilazane coatings are reported to have a pencil hardness of 5H when cured at room temperature, contrasting the more widely used polysiloxane coatings with pencil hardness of 5B using the same curing conditions. Other polysilazane coatings have a coefficient of friction between 0.03 and 0.05, similar to the 0.04 of the famous anti-stick, Teflon, but with far better scratch and wear resistance. Coating hardness as high as 3 GPa have been reported for room temperature cured inorganic perhydropolysilazane coatings (yielding $SiO_2$), and an impressive 13 GPa upon further treatment at 700-1000° C., attesting to the depth of cross-linking in the functional units of polysilazane. Set apart from other common polymers such as polysiloxane (silicones) polyurethane, epoxy resin, PMMA, often employed because of their ease of use and/or low reactivity at ambient conditions, polysilazanes have, with their high reactivity, been referred to as the ultimate binder among its class (polymers used in wet chemistry formulation).

Although their high reactivity is the reason for their excellent coating properties, the reactivity of polysilazanes also constitutes challenges, and is the main reason preventing more widespread utilisation. The polysilazanes must be handled and used with care, excluding moisture and heat. Further, their reactivity limits the use of additives, such as catalysts, that may be necessary to enhance coating performance. Reaction of polysilazane Si—H functional units with additives bearing nucleophilic groups such as hydroxyl, carbonyl, carboxylic, amine or other reactive functional units can lead to breakdown of the polymer backbone. Even the addition of the frequently used post-coating curing additive (3-aminopropyl)triethoxysilane (APTES) just prior to coating application leads to significant fragmentation and loss of coating material (polysilazane fragments), up to 23-31% loss depending on humidity, compared to organic polysilazane without APTES. Fragmentation may lead to poor anti-stick coating properties for coatings based on organic polysilazanes, particularly when cured at low humidity, since volatile fragments are likely to evaporate before they react with non-volatile fragments or the polymer backbone. Fragmentation further frequently leads to lower coating hardness and undesirably high coating surface roughness, in addition to the loss of material. Hence, the coating quality very often leaves something to be desired—either the reactive additives that would lead to improved quality are left out, or they are included but at the cost of fragmentation and/or poor coating quality, or added in amounts not sufficient to impact maximum benefit.

Attempts to improve the properties of polysilazane coatings have thus far focused on the choice of the additives, curing methods and manipulation of the coating after application. For instance, Furtat et al. [J. Mater. Chem. A, 2017, 5, 25509-25521] improved the hydrophobicity, inertness and chemical resistance of the organic polysilazane Durazane 1800 coating by first reacting it with a fluoroalcohol in the presence of solution cross-linking catalyst to avoid and/or reverse fragmentation, quenching the catalysis, and filtering the polymer-fluoroalcohol hybrid which was then redissolved and applied as a coating. Albeit an interesting approach, the method involves time-consuming processes and is mainly suited to the sterically hindered and hence less reactive Durazane 1800. The work highlights some of the challenges in the formation of polysilazane coatings: With more reactive polysilazanes, the entire process would have to be conducted in an inert environment. Furthermore, scaling up with more reactive polysilazanes would be challenging because of the need to use very dilute solutions to avoid too fast reactions, such as fragmentation outpacing cross-linking, and formation of insoluble precipitates. Said obstacles can be avoided by using coating additives containing functional groups which do not react spontaneously with polysilazanes, e.g vinyl groups which undergo post-coating radical reactions with Si—H with suitable catalysts and activators such as UV, plasma, or heat. However, this approach is naturally self-limiting, it being a solid-state reaction with the risk that some of the additives will not be covalently bound to the polymer, or of phase separation (e.g fluorinated additives may accumulate only at the top of the coating). Furthermore, the types of additives that can be employed are severely limited.

The limitations regarding types of additives thus remain a challenge, as does the material loss described above. Consequently, there is a need for new ways of enhancing the properties of polysilazane coatings by broadening the scope of applicable additives, as well as for minimising the formation of volatile fragments, in order to expand the large-scale utilisation of polysilazane coatings. Further, there is also a need for methods for better controlling porosity and surface roughness of the coatings, and for decreasing post-coating processing times and dry-to-touch times.

BRIEF SUMMARY OF THE INVENTION

The inventors have come to the realisation that the above-mentioned problems can be solved by controlling the reactivity of polysilazane when components are introduced to a coating formulation, and thereby also minimising or eliminating the formation of fragments. They have invented a process for "in situ" mixing, stepwise in a predetermined order and under time control, of the components of a polysilazane based coating composition directly before and/ or during application of the coating to a substrate. The various components are selected based on the desired properties of the coating, and the mixing order depends on the sensitivity and/or reactivity of the various components to each other. The method thus allows the use of a wider range of additives, and the time-controlled mixing limits material loss and/or excessive reactions, both resulting in polysilazane coatings with improved quality compared to known polysilazane coatings. The method also enables better control of the porosity and surface roughness of the coating, and enables coatings to be made that display lower post-coating processing and dry-to-touch times than commonly used polysilazane coatings.

In one aspect, the invention provides a polysilazane coating method for limiting fragmentation of polysilazane, the method comprising the steps of i) preparing a coating composition, wherein the preparation of the coating composition comprises the sub-steps of a. introducing a component A into a coating composition vessel;

b. introducing a component B into a coating composition vessel and mixing component B with component A; and c. introducing a component C into a coating composition vessel and mixing component C with components A and B;

wherein the components A, B, and C each are chosen from the group of polysilazanes, the group of catalysts, or the group of reactive nanomaterials and/or reactive molecules that can react spontaneously with a polysilazane polymer backbone to cause fragmentation, wherein the components A, B, and C are all chosen from different groups;

wherein the introduction in sub-step ic) is initiated a predetermined time period $t_c$ after the introduction in sub-step ib); and wherein $t_c$ is chosen so that $0 < t_c < 900$ seconds;

wherein $t_c$ and the choice of group for each of the components are predetermined based on the known reactivity of the components towards each other;

ii) applying the coating composition to a substrate; wherein step ii) is initiated a predetermined time period $t_{ii}$ 1-1200 seconds after the initiation or after the completion of the final sub-step of step ii), and wherein $t_{ii}$ is predetermined based on the known reactivity of the components towards each other.

In another aspect, the invention provides an assembly for performing a polysilazane coating method for limiting fragmentation of polysilazane.

Further advantageous effects are shown in the dependent claims.

BRIEF DESCRIPTION OF THE DRAWINGS

In order to make the invention more readily understandable, the description that follows will refer to the accompanying drawings, in which:

FIG. 1 is a flow chart illustrating the method according to the invention.

FIG. 2 is a flow chart illustrating an embodiment of the method according to the invention.

DETAILED DESCRIPTION OF THE INVENTION

Figure 3:
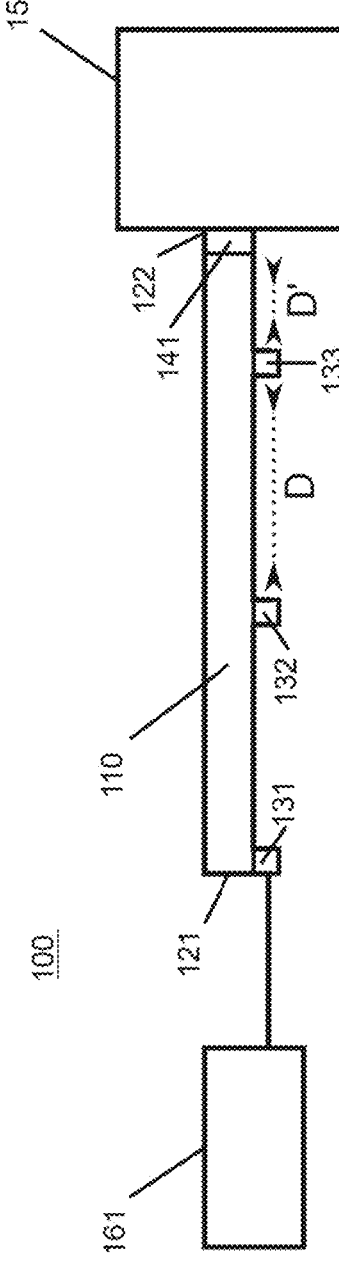
FIG. 3 is a schematic representation of an assembly according to the invention.

Unless otherwise defined, all terms of art, notations and other scientific terms or terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art.

As used herein, the term "polysilazane" refers to a polymer in which silicon and nitrogen atoms alternate to form the basic backbone, the polymer containing chains and/or rings of the formula $[R^1R^2Si—NR^3]_n$, wherein $R^1$, $R^2$, and $R^3$ can be hydrogen atoms and/or identical or different organic substituents. The term polysilazane may be used to refer to any one of an inorganic polysilazane, an organic polysilazane, a polyborosilazane, a polysiloxazane, or any combination of these, or any crosspolymer comprising any of these or a combination of any of these, or any copolymer comprising a —Si—N—Si— backbone and Si—H and N—H functional units.

The terms "perhydropolysilazane" ("PHPS") and "inorganic polysilazane" are used interchangeably to refer to any polysilazane of the formula $[H_2Si—NH]_n$.

The term "organic polysilazane" ("OPSZ") is used to refer to any polysilazane of the formula $[R^1R^2Si—NR^3]_n$, wherein at least one of $R^1$, $R^2$, and $R^3$ is an organic substituent, wherein an organic substituent is defined as any substituent comprising carbon.

The term "polysilazane coating composition" as used herein refers to any composition that comprises a polysilazane and that may be used for coating a substrate.

The term "component" is used herein to refer to any compound or material that is or is to be included in a polysilazane coating composition. The term "component" thus includes any material, compound, additive or the like that the skilled person would consider including in a polysilazane coating composition.

As used herein, the term "reactive", used with reference to certain components, refers to the ability of said component to partake in a spontaneous chemical reaction or physical interaction, such as aggregation, that results in a chemical or physical transformation, with any other component that is or may be present in a polysilazane coating composition, on the time scale t for making or storing a polysilazane coating composition. t may be hours, such as 5 hours, such as 3 hours, such as 2 hours. t may be minutes, such as 60 minutes, such as 30 minutes, such as 10 minutes, such as 5 minutes, such as 2 minutes. t may be seconds, such as 60 seconds, such as 30 seconds.

As used herein, the terms "spontaneous" and "spontaneously", used with reference to a reaction, refers to a reaction taking place at the temperature T and pressure p for making a polysilazane coating composition without the need for a catalyst or any other activator. T may be ambient temperature. p may be ambient pressure.

The term "simultaneously" as used herein refers to any two or more processes that are occurring at the same time or roughly at the same time, and is not to be understood strictly. It is not intended that the processes need to begin nor end together.

As used herein, the term "vessel" refers to any type of container, receptacle, tube, pipe, manifold, channel, or other device suitable for receiving and/or containing and/or transporting a coating component and/or coating composition.

As used herein, the term "mixing", or any variations thereof, refers to any method for combining components of a coating composition, such as, but not limited to, admixing, contacting, blending, stirring or allowing to admix, contact, blend, stir.

As used herein, the term "fragmentation" refers to a cleavage of a backbone Si—N bond in a polysilazane polymer.

As used herein, the term "applicator" refers to any means for applying a coating composition to a substrate.

The term "solvent" as used herein refers to a liquid substance in which a compound is soluble enough at a given concentration to dissolve the compound. The term refers both to solvent blends (i.e., solvents consisting of a plurality of constituents) and to pure compounds (i.e., solvents consisting of a single constituent) unless the context indicates otherwise.

The term "anhydrous conditions" as used herein refers to the avoidance in the reaction mixture of any substantial amount of moisture, such as the reaction mixture containing less than 0.5% by weight water, but is not intended to mean the total absence of any moisture.

The term "anhydrous solvent" as used herein refers to solvents containing less than 0.5% by weight water, and that may be maintained and handled under nitrogen or argon gas during a reaction.

In the following, general embodiments as well as particular exemplary embodiments of the invention will be described. References will be made to the accompanying drawings. It shall be noted, however, that the drawings are exemplary embodiments only, and that other features and embodiments may well be within the scope of the invention as claimed.

It is clear to the person skilled in the art that not only the coatings disclosed herein, but also a wide range of other polysilazane based coatings, can also be formed on a substrate in accordance with the present invention, using the disclosed method and/or assembly.

There are generally two types of polysilazanes: the inorganic perhydropolysilazane (PHPS) and the organic polysilazanes (OPSZ) comprising organic pendant groups on some of the Si atoms. The organic pendant groups may be or include reactive centres. The well-known Durazane 1800 comprises vinyl as pendant groups. Due to hydrogen bonded to the backbone elements (Si—H and N—H), polysilazanes are highly reactive. Polysilazanes can undergo hydrolysis and cross-linking to form SiO$_2$ or cross-linking by dehydrogentation to form stable Si—N and Si—Si bonds. Si—H can also undergo hydrosilylation reaction and/or cross-linking with the vinyl centre in Durazane 1800, e.g. to form Si—C bonds. These reactions can be promoted in solution or post-coating with curing additives such as catalysts or hydrolysis enhancing agents, heat, moisture, acids, bases, hydrogen peroxide, etc.

The high reactivity of the Si—H and Si—NH—Si groups of polysilazanes with moisture and polar surfaces is the reason why polysilazanes are used in coatings, giving polysilazane coatings with high cross-linking densities and therefore superior properties to the isoelectronic polysiloxanes. Many metals, glass, ceramics, and plastics with hydroxyl groups on the surface are easily wetted by polysilazanes. PHPS in particular is extremely reactive, since its functional units are far less affected by steric hindrance than those of organic polysilazanes. PHPS polymers can therefore achieve high cross-linking densities even at room temperature.

The following have been identified as possible routes for thermal curing of polysilazanes:

hydrosilylation—reaction between a vinyl group and Si—H;

dehydrogenation—reaction between two Si—H groups or between Si—H and N—H; and vinyl group polymerisation.

Hydrosilylation can be carried out at or near room temperature with metal complexes as catalysts. When exposed to moisture, the Si—H and Si—NH—Si groups undergo hydrolysis to yield silanols, which then are cross-linked to yield Si—O—Si bonds. These reactions can also be enhanced with additives which get readily hydrolysed on exposure to air, e.g. APTES. This is particularly important for OPSZ, since their reactivity is limited by steric hindrance. Alkoxy groups can also be grafted onto the polysilazane molecule to speed up hydrolysis and cross-linking.

The hydrolysis and cross-linking of polysilazane are the most important reactions taking place at or around room temperature. DCP and alkoxy bearing additives or grafted groups are employed to further increase the reactivity of OPSZ. Room temperature cross-linking in solution (liquid form, homogeneous) can also be promoted with nucleophiles (e.g tetra-n-butylammoniumfluoride, (TBAF)), dicumyl peroxide (DCP) and metal complexes to yield Si—N bonds, Si—C bonds, etc. Silicon, nitrogen and carbon centres cross-linked in solution are thus not available for further reactions, including post coating curing.

Additives are necessary to enhance the properties of polysilazane coatings, such as hardness, hydrophobicity, friction coefficient, scratch and wear resistance, or to confer new characteristics such as anti-pathogenic, flexural strength, magnetic, superhydrophobic, icephobic, thermal and electrical conductivities, etc. Furthermore, it is essential that the additives are not just in a state of physical union with the polysilazane molecules, but rather attached to the polysilazane molecules, preferably covalently. I.e., the additives must react with the polysilazane. When such reactions are carried out, the presence of a cross-linking catalyst such as TBAF is important to avoid fragmentation. Extensive cross-linking with time will normally lead to precipitation, and therefore destabilisation of coating formulation. Hence both reactions with additives and cross-linking of polysilazane functional groups need to be controlled and handled in a time-controlled manner.

The high reactivity of the polysilazanes represents a big challenge with regards to the choice of additives. The polysilazanes are incompatible with moisture, any polar protic solvent, acids, bases, and all materials, including nanomaterials, that contain reactive functional groups such as hydroxyl. Depending on the type of polysilazane (steric hindrance effect) and chemical environment of functional groups polysilazanes may also be incompatible with functional groups such as carbonylamine, etc. The shelf life of the polysilazanes decreases with increasing exposure to atmospheric moisture as well as to materials with the aforementioned reactive groups. Hence, for medium to large scale industrial applications, constant exposure of polysilazane based coating formulations in an uncontrolled environment is not profitable. Further, addition of nanomaterials or other additives with reactive functional groups leads to fragmentation of the polysilazanes into volatile components, leading to significant loss of materials; even curing agents such as APTES will lead to fragmentation, even when added just before application of the coating. Only OPSZ formulations may contain common curing additives such as APTES and DCP; PHPS is too reactive. Hence, a limit exists on the ability to enhance coating properties via various additives, such as nanomaterials for synergic effects, e.g antibacterial, superhydrophobic or solid lubricating effects, or additives for accelerating curing, especially desirable at low temperatures, and hence reduction of processing time.

Fragmentation refers to the decomposition of polysilazane backbone to yield volatile and/or non-volatile fragments. These fragments may be reactive or non-reactive. Loss of volatile fragments contributes significantly to lowering of coating yield. The post-coating curing additive APTES is frequently added to certain types of OPSZ or grafted to the polymer backbone. The inclusion of APTES leads to significant fragmentation and loss of coating material. The more reactive hydroxyl groups can lead to a violent fragmentation reaction of OPSZ, causing significant reduction in coating hardness and other mechanical properties.

In general, fragmentation of polysilazane in a coating process may lead to:

loss of coating material and high demand on systems for waste handling;

lower coating hardness because of lower molecular weight due to fragmentation; and undesirably high coating surface roughness at low humidity (micro range) which negatively impacts coating properties such as anti-stick properties, and, invariably, friction coefficients.

The inventors have invented a method for forming a polysilazane coating, and an assembly for performing said method, that solves the above-mentioned problems related to polysilazane coating, including eliminating or at least limiting fragmentation. There is no need to prepare and store an unstable polysilazane formulation. The method of the invention represents a practical and cost-efficient method, particularly for industrial purposes, as it achieves the desired level of cross-linking while avoiding extreme or high-cost conditions.

The controlled solution cross-linking allows a reduction in the time necessary for post-coating cross-linking. Using other methods, PHPS coatings can be processed into almost fully functionalised coatings with high hardness and precise optical properties/refractive index in 10 minutes by exposure to $H_2O_2$, etc. The method of the invention allows a controlled prior cross-linking in solution, without compromising the quality of the coating. The shortening of the post-coating cross-linking time is important for industrial-scale coatings and high production.

In one aspect, the invention provides a polysilazane coating method for limiting fragmentation of polysilazane.

In some embodiments, the invention provides a polysilazane coating method for limiting fragmentation of polysilazane, the method comprising i) mixing a polysilazane and a catalyst;

ii) applying the coating composition to a substrate;

wherein step ii) is initiated a predetermined time period after step i).

In some embodiments, the invention provides a polysilazane coating method for limiting fragmentation of polysilazane, the method comprising i) a stepwise mixing of a polysilazane, a catalyst and a further component, wherein the order of and the time periods between the mixing steps are predetermined based on the known reactivity of the polysilazane, the catalyst and the further coating component towards each other;

ii) applying the coating composition to a substrate;

wherein step ii) is initiated a predetermined time period after step i).

In some embodiments, the invention provides a polysilazane coating method for limiting fragmentation of polysilazane, the method comprising i) a stepwise mixing of a polysilazane, a catalyst, and a reactive nanomaterial, wherein the order of and the time periods between the mixing steps are predetermined based on the known reactivity of the polysilazane, the catalyst and the reactive nanomaterial towards each other;

ii) applying the coating composition to a substrate;

wherein step ii) is initiated a predetermined time period after step i).

In some embodiments, the invention provides a polysilazane coating method for limiting fragmentation of polysilazane, the method comprising the steps of i) preparing a coating composition, wherein the preparation of the coating composition comprises the sub-steps of a. introducing a component A into a coating composition vessel;

b. introducing a component B into a coating composition vessel and mixing component B with component A; and c. introducing a component C into a coating composition vessel and mixing component C with components A and B;

wherein one of the components A, B, and C comprises one or more polysilazanes;

wherein the introduction in sub-step ic) is initiated a predetermined time period $t_c$ after the introduction in sub-step ib); and wherein $t_c$ is chosen so that $0 < t_c < 900$ seconds;

wherein $t_c$ and the choice of group for each of the components are predetermined based on the known reactivity of the components towards each other;

ii) applying the coating composition to a substrate;

wherein step ii) is initiated a predetermined time period $t_{ii}$ 1-1200 seconds after the initiation or after the completion of the final sub-step of step ii), and wherein $t_{ii}$ is predetermined based on the known reactivity of the components towards each other.

In some embodiments, the invention provides a polysilazane coating method for limiting fragmentation of polysilazane, the method comprising the steps of i) preparing a coating composition, wherein the preparation of the coating composition comprises the sub-steps of a. introducing a component A into a coating composition vessel;

b. introducing a component B into a coating composition vessel and mixing component B with component A; and c. introducing a component C into a coating composition vessel and mixing component C with components A and B;

wherein one of the components A, B, and C comprises one or more polysilazanes and another one of the components A, B, and C is a catalyst, wherein the introduction in sub-step ic) is initiated a predetermined time period $t_c$ after the introduction in sub-step ib); and wherein $t_c$ is chosen so that $0 < t_c < 900$ seconds;

wherein $t_c$ and the choice of group for each of the components are predetermined based on the known reactivity of the components towards each other;

ii) applying the coating composition to a substrate;

wherein step ii) is initiated a predetermined time period $t_{ii}$ 1-1200 seconds after the initiation or after the completion of the final sub-step of step ii), and wherein $t_{ii}$ is predetermined based on the known reactivity of the components towards each other.

In some embodiments, the invention provides a polysilazane coating method for limiting fragmentation of polysilazane, the method comprising the steps of i) preparing a coating composition, wherein the preparation of the coating composition comprises the sub-steps of a. introducing a component A into a coating composition vessel;

b. introducing a component B into a coating composition vessel and mixing component B with component A; and c. introducing a component C into a coating composition vessel and mixing component C with components A and B;

wherein the components A, B, and C each are chosen from the group of polysilazanes, the group of catalysts, or the group of reactive nanomaterials and/or reactive molecules that can react spontaneously with a polysilazane polymer backbone to cause fragmentation, wherein the components A, B, and C are all chosen from different groups;

wherein the introduction in sub-step ic) is initiated a predetermined time period $t_c$ after the introduction in sub-step ib); and wherein $t_c$ is chosen so that $0 < t_c < 180$ seconds;

wherein $t_c$ and the choice of group for each of the components are predetermined based on the known reactivity of the components towards each other;

ii) applying the coating composition to a substrate;

wherein step ii) is initiated a predetermined time period $t_{ii}$ 1-180 seconds after the initiation or after the completion of the final sub-step of step ii), and wherein $t_{ii}$ is predetermined based on the known reactivity of the components towards each other.

In some embodiments, the invention provides a polysilazane coating method for limiting fragmentation of polysilazane, the method comprising the steps of i) preparing a coating composition, wherein the preparation of the coating composition comprises the sub-steps of a. introducing a component A into a coating composition vessel;

b. introducing a component B into a coating composition vessel and mixing component B with component A; and c. introducing a component C into a coating composition vessel and mixing component C with components A and B;

wherein the components A, B, and C each are chosen from the group of polysilazanes, the group of catalysts, or the group of reactive nanomaterials and/or reactive molecules that can react spontaneously with a polysilazane polymer backbone to cause fragmentation, wherein the components A, B, and C are all chosen from different groups;

wherein the introduction in sub-step ic) is initiated a predetermined time period $t_c$ after the introduction in sub-step ib); and wherein $t_c$ is chosen so that $0 < t_c < 900$ seconds;

ii) applying the coating composition to a substrate;

wherein step ii) is initiated a predetermined time period $t_{ii}$ 1-1200 seconds after the initiation or after the completion of the final sub-step of step ii).

In some embodiments, the invention provides a polysilazane coating method for limiting fragmentation of polysilazane, the method comprising the steps of i) preparing a coating composition, wherein the preparation of the coating composition comprises the sub-steps of a. introducing a component A into a coating composition vessel;

b. introducing a component B into a coating composition vessel and mixing component B with component A; and c. introducing a component C into a coating composition vessel and mixing component C with components A and B;

wherein the components A, B, and C each are chosen from the group of polysilazanes, the group of catalysts, or the group of reactive nanomaterials, wherein the components A, B, and C are all chosen from different groups;

wherein the introduction in sub-step ic) is initiated a predetermined time period $t_c$ after the introduction in sub-step ib); and wherein $t_c$ is chosen so that $0 < t_c < 900$ seconds;

wherein $t_c$ and the choice of group for each of the components are predetermined based on the known reactivity of the components towards each other;

ii) applying the coating composition to a substrate;

wherein step ii) is initiated a predetermined time period $t_{ii}$ 1-900 seconds after the initiation or after the completion of the final sub-step of step ii), and wherein $t_{ii}$ is predetermined based on the known reactivity of the components towards each other.

In some embodiments, as illustrated in FIG. 1, the invention provides a polysilazane coating method for limiting fragmentation of polysilazane, the method comprising the steps of i) preparing a coating composition, wherein the preparation of the coating composition comprises the sub-steps of a. introducing a component A into a coating composition vessel;

b. introducing a component B into a coating composition vessel and mixing component B with component A; and c. introducing a component C into a coating composition vessel and mixing component C with components A and B;

wherein the components A, B, and C each are chosen from the group of polysilazanes, the group of catalysts, or the group of reactive nanomaterials and/or reactive molecules that can react spontaneously with a polysilazane polymer backbone to cause fragmentation, wherein the components A, B, and C are all chosen from different groups;

wherein the introduction in sub-step ic) is initiated a predetermined time period $t_c$ after the introduction in sub-step ib); and wherein $t_c$ is chosen so that $0 < t_c < 900$ seconds;

wherein $t_c$ and the choice of group for each of the components are predetermined based on the known reactivity of the components towards each other;

ii) applying the coating composition to a substrate;

wherein step ii) is initiated a predetermined time period $t_{ii}$ 1-900 seconds after the initiation or after the completion of the final sub-step of step ii), and wherein $t_{ii}$ is predetermined based on the known reactivity of the components towards each other.

In some embodiments, the invention provides a polysilazane coating method for limiting fragmentation of polysilazane, the method comprising the steps of iii) preparing a coating composition, wherein the preparation of the coating composition comprises the sub-steps of a. introducing a component A into a coating composition vessel;

b. introducing a component B into a coating composition vessel and mixing component B with component A; and c. introducing a component C into a coating composition vessel and mixing component C with components A and B;

wherein the components A, B, and C each are chosen from the group of polysilazanes, the group of catalysts, or the group of reactive nanomaterials, wherein the components A, B, and C are all chosen from different groups;

wherein the introduction in sub-step ic) is initiated a predetermined time period $t_c$ after the introduction in sub-step ib); and wherein $t_c$ is chosen so that $0 < t_c < 900$ seconds;

wherein $t_c$ and the choice of group for each of the components are predetermined based on the known reactivity of the components towards each other;

iv) applying the coating composition to a substrate;

wherein step ii) is initiated a predetermined time period $t_{ii}$ 1-900 seconds after the initiation or after the completion of the final sub-step of step ii), and wherein $t_{ii}$ is predetermined based on the known reactivity of the components towards each other.

In some embodiments, as illustrated in FIG. 1, the invention provides a polysilazane coating method for limiting fragmentation of polysilazane, the method comprising the steps of iii) preparing a coating composition, wherein the preparation of the coating composition comprises the sub-steps of a. introducing a component A into a coating composition vessel;

b. introducing a component B into a coating composition vessel and mixing component B with component A; and c. introducing a component C into a coating composition vessel and mixing component C with components A and B;

wherein the components A, B, and C each are chosen from the group of polysilazanes, the group of catalysts, or the group of reactive nanomaterials and/or reactive molecules that can react spontaneously with a polysilazane polymer backbone to cause fragmentation, wherein the components A, B, and C are all chosen from different groups;

wherein the introduction in sub-step ic) is initiated a predetermined time period $t_c$ after the introduction in sub-step ib); and wherein $t_c$ is chosen so that $0 < t_c < 900$ seconds;

wherein $t_c$ and the choice of group for each of the components are predetermined based on the known reactivity of the components towards each other;

iv) applying the coating composition to a substrate;

wherein step ii) is initiated a predetermined time period $t_{ii}$ 1-1200 seconds after the initiation or after the completion of the final sub-step of step ii), and wherein $t_{ii}$ is predetermined based on the known reactivity of the components towards each other.

In some embodiments, the method further comprises a further step iii), that is performed after step ii). In certain embodiments, step iii) comprises curing the coating composition. Curing may be aided by one or more of vapour of $H_2O_2$, atmospheric humidity, thermally, by UV or visible light, especially with photoinitiators used as additives.

In some embodiments, the catalyst is a cross-linking catalyst, such as a catalyst for cross-linking polysilazanes. In some embodiments, the catalyst is a cross-linking catalyst or a catalyst for promoting reaction between polysilazane and any of the other components present in the coating composition.

In some embodiments, the vessel used in the method of the invention is a container with only one opening, such as a beaker, a flask, a reactor. In such embodiments, the components of the coating composition may be introduced batchwise rather than continuously. The components may be mixed, such as a consequence of the introduction, such as actively mixed.

In preferred embodiments, the vessel used in the method of the invention is an elongated device with more than one opening, such as a tube with more than one inlet port, such as a manifold. The dimensions of the vessel may be chosen to enable sufficient mixing. In such embodiments, the coating composition is run, such as pumped, through the vessel, such as towards an applicator. In certain embodiments, the introduction of the components and the running of the coating composition through the vessel is a continuous flow process. In certain embodiments, such as in batch operation, said continuous flow process includes frequent pauses. The time periods $t_{ii}$ and $t_c$ between the steps and the sub-steps may be controlled by the timing of the introduction of the components, the shape and volume of the coating composition vessel, and the flow rate of the coating composition through the vessel.

The skilled person is knowledgeable on how to choose introduction rates and introduction volumes for each of the components suitable for the chosen vessel. In certain embodiments, a pressure generator, such as a pump, is used to realise the introduction of the components. The relative proportions of the components are controlled by their concentrations and relative flow rates.

In some embodiments, the mixing of the components results solely from the introduction of the components into the coating composition vessel. In other embodiments, the mixing is realised by a mixing means, such as ultrasonication, flow redirecting barriers (FRB), coiled flow path (CFP), stirring. In some embodiments, ultrasonication may lead to excessive reaction and/or precipitation, and thus in these embodiments, FRB, CFP, and/or stirring is preferred.

In some embodiments, the coating composition in the vessel is subject to an external activator, such as UV-visible light, ultrasonic wave, plasma, laser, heat, sonication, such as to promote a reaction. For example, ultrasonication can break open a C=C bond in a carbon nanotube and hence promote its reaction with Si—H and N—H functional units in a polysilazane or with a hydroxyl functional group in another component. Heat may lead to dehydrogenation cross-linking reactions.

In some embodiments, the coating composition comprises further components in addition to a polysilazane, a catalyst, and an active nanomaterial and/or a reactive molecule that can react spontaneously with a polysilazane polymer backbone to cause fragmentation. In some embodiments, the further components are additives, such as for introducing or tuning certain properties of the coating composition and/or the coating.

In certain embodiments, such further components are introduced and mixed into the coating composition in additional sub-steps of step i), such as before, after or between steps ia), ib), and ic). In certain embodiments, such further components are introduced and mixed into the coating composition simultaneously with one or more of steps ia), ib), and ic). The further components may or may not be contacted and/or mixed with components A, B and/or C before the introduction into the coating composition vessel.

In some embodiments, one or more of the components, such as one or more of polysilazane, catalyst, reactive nanomaterial or reactive molecule, is introduced in more than one step i) sub-step. In certain embodiments, one or more polysilazanes are introduced in more than one step i) sub-step.

The time periods between the sub-steps of step i), i.e. t, as well as any time period $t_x$ from a step i) sub-step to the introduction of an additional component in an additional step i) sub-step ix) following immediately after said step i) sub-step, the chosen groups for components A, B, and C, and any additional component, and the time period $t_{ii}$ between step i) and step ii), are all chosen based on the known reactivities of the components of the coating composition towards each other, in order to control the extent of any reactions taking place between components of the coating composition.

The method of the invention, with its controlled in situ introduction of the components of the coating composition, allows the use of reactive additives that otherwise may not be usable, while also keeping fragmentation at bay.

Some of the benefits of in situ introduction of a cross-linking catalyst, according to the method of the invention, are:

There is no need to prepare and store an unstable polysilazane formulation.

The above-listed problems related to fragmentation of polysilazane are solved by reversing said fragmentation. Interestingly, polymer molecular weight is also increased beyond the original value. Therefore mechanical, optical and possibly other properties of the polymer can be enhanced with the cross-linking catalyst alone.

Further, since the utilisation of the coating materials is maximised, the environmental footprint of the coating process is decreased compared to traditional coating methods—the energy and material resources needed for safe handling of waste product are reduced.

The method leads to shorter post-coating processing times because the functional groups already cross-linked in solution are taken out of reckoning. The same is true for the dry-to-touch time, which is beneficial for faster roll-2-roll operation.

The method can lead to target mechanical and optical properties for a given processing time, compared to formulation without prior solution cross-linking. For example, coating hardness and scratch resistance may be increased due to higher molecular weight while gloss may be reduced due to higher surface roughness occasioned by the formation of nano and/or micro particles comprising cross-linked polysilazanes.

Porosity for given applications can be controlled using the degree of solution cross-linking and/or amount of catalysts. The amount of dehydrogenation cross-linking catalyst is directly related to the amount of hydrogen evolved.

The method of the invention represents a practical and cost-efficient method, that achieves a desired level of cross-linking while avoiding extreme or high-cost conditions.

Further, the controlled in situ mixing allows the use of reactive additives, such as reactive nanomaterials, to enhance coating properties. E.g., porosity can also be controlled using certain additives, as well as by fine-tuning the time from its introduction into the coating mixture to application. Reactive additives may be introduced in a late sub-step of step i), thus limiting their time in contact with the polysilazane.

For the method or the assembly of the invention, the components of the coating can be obtained in any way known to the skilled person, such as obtained from a natural source, such as acquired commercially, such as synthesised using any route and starting materials.

The polysilazane to be used in the method, or with the assembly, of the invention may be selected from the list comprising PHPS, OPSZ, polyborosilazane, polysiloxazane and any combination thereof. The polysilazane may be a copolymer. The polysilazane may be a cross-polymer. In some embodiments, the number average molecular weight of the polysilazane is in the range of 100 to 150,000 g/mol, such as 600 to 100,000 g/mol. The polysilazane may be an oligomer, such as an oligomer with a number average molecular weight in the range of 500 to 1300 g/mol.

In some embodiments, the polysilazane is PHPS. In some embodiments, the polysilazane is one or more OPSZ. In some embodiments, the polysilazane is Durazane 1800.

In some embodiments, the polysilazane comprises an OPSZ of formula $[R^1R^2Si—NR^3]_n$, wherein at least one of $R^1$, $R^2$, and $R^3$ is an organic substituent. In some embodiments, at least one of $R^1$, $R^2$, and $R^3$ is an organic substituent having one or more carbon atoms directly bonded to a silicon atom or a nitrogen atom of the backbone. In some embodiments, at least one of $R^1$, $R^2$, and $R^3$ is an organic substituent having at least one heteroatom directly bonded to a silicon atom or a nitrogen atom of the backbone. Such heteroatoms may be selected from the group comprising, but not limited to, silicon, nitrogen, oxygen, sulphur. In some embodiments, at least one of $R^1$, $R^2$, and $R^3$ is an organic substituent having 1-18 carbon atoms, such as 1-12 carbon atoms, such as 1-8 carbon atoms. In some embodiments, at least one of $R^1$, $R^2$, and $R^3$ is an organic substituent selected from the group comprising, but not limited to, alkyl, alkenyl, cycloalkyl, aryl, aralkyl, alkyl, silyl, alkylamino, alkoxy, nitrile. At least one of $R^1$, $R^2$, and $R^3$ may comprise a substituent selected from the group comprising, but not limited to, alkoxy groups, cyano groups.

In preferred embodiments, at least one of $R^1$, $R^2$, and $R^3$ is an organic substituent selected from the group comprising, but not limited to, alkyl, alkenyl, alkynyl, alkoxyalkyl, organofluorine groups such as fluorocarbons, hydrofluorocarbons, fluorocarbenes.

In some embodiments, the polysilazane comprises an OPSZ comprising pendant groups that comprise carbon-carbon double bonds. In such embodiments, the use of a platinum complex and/or DCP can lead to hydrosilylation reactions (free radical for DCP), which breaks the double bond in order to react with Si—H. These reactions represent another form of solution cross-linking, or can be used to bond nanomaterials with unsaturated bonds. A catalyst and/ or a reactant may be used to open unsaturated bonds to aid their reaction, as known to the person skilled in the art.

Reactive nanomaterials that may be used in the method, or with the assembly, of the invention are nanomaterials containing functional units that can react directly or indirectly with Si—H motifs and/or N—H and/or Si—NH—Si motifs in an organic or inorganic polysilazane and/or with vinyl groups in an organic polysilazane. Such functional groups include hydroxyl, carbonyl, carboxylic, amine/ amino, epoxy, thiol, carbon-carbon double bonds such as in graphene and graphene oxide, B—N triple bond in hexagonal boron nitride.

In some embodiments, the reactive nanomaterial can react spontaneously with a polysilazane polymer backbone to cause fragmentation. In some embodiments, the coating composition comprises more than one reactive nanomaterial.

The reactive nanomaterial may have various forms, such as particles, wire-like, rod-like, platelets. In some embodiments, the nanomaterial is a nanoparticle. In some embodiments, the nanomaterial is chosen from the list comprising, but not limited to, $SiO_2$; carbon-based materials such as graphene, graphene oxide, carbon nanotubes; $TiO_2$; ZnO; SnO; $WS_2$; $MoS_2$; boron nitride; silver; other inorganic nanomaterials. Other non-limiting examples are organic nanomaterials such as nanocellulose, e.g. cellulose nanofibers and crystals, hybrids such as polyhedral oligomeric silsesquioxanes (POSS).

The reactive nanomaterial may be selected from the list comprising, but not limited to inorganic nanomaterials such as silica, titanium dioxide, graphene, boron nitride; magnetic nanomaterials; antibacterial nanomaterials such as graphene oxide, silver; hybrid nanomaterials such as polyhedral oligomeric silsesquioxane, (POSS). The nanomaterials may be organic nanomaterials. In some embodiments, at least two types of nanomaterials are included in the coating composition. The reactive nanomaterial is chosen based on the desired properties of the coating.

Inorganic nanomaterials may react with polysilazanes via their naturally occurring functional groups, e.g. hydroxyl groups in oxide nanomaterials, carbon-carbon double bonds in carbon based materials, or they may be functionalised in order to enhance or control their reaction and/or confer additional properties such as flexibility through bonding to an organic material. Such functionalisation may be accomplished by several means, a common method being direct or indirect reactions with silanes. For example, use of APTES will confer amine functional groups while use of triethoxyvinyl silane confers vinyl functional groups. To improve their dispersion and stability in solution, inorganic nanomaterials may be surface-modified by the anchoring of short, medium or long chain alkyl or organofluorine groups on them, such as using silanes. Said alkyl or organofluorine groups may be or carry the reactive functional groups, e.g. butyronitrile (bearing a carbon-nitrogen triple bond) and propyl methacrylate (bearing a vinyl unit). The use of silane coupling agents to achieve dispersion and stability and promote reactivity of inorganic particles with polymers is well known in the field. The modifying groups may also be completely inert, e.g perfluorooctyl or propyl groups from appropriate silanes.

In the method of the invention, the reactive nanomaterial may be replaced by or combined with a reactive molecule that can react spontaneously with a polysilazane polymer backbone to cause fragmentation. Said molecule must comprise a functional group known to the skilled person to be able to react spontaneously with a polysilazane to break Si—N bonds. In some embodiments, said reactive molecule is a monomer, such as 1,2-benzenedimethanol, such as hexane-1,6 diol diacrylate. In some embodiments, said reactive molecule is an oligomer, such as urethane acrylate. In some embodiments, said reactive molecule is a short, medium or long chain organic compounds, such as 2-fluoroethanol, 2,2,2-trifluoroethanol, triethoxyvinylsilane,1,8-octanediol, 1H,1H,2H,2H-perfluorooctyltriethoxysilane, erucamide, behenamide. In some embodiments, said reactive molecule is a polymer, such as polyethylene glycol, a polyethylene glycol derivative, a polyethylene glycol co-polymer, cellulose. For example, if the aim is a coating with very low friction coefficient, inorganic nanomaterials, which can increase surface roughness, may be substituted or combined with 2-fluoroethanol to take advantage of the low surface energy of C—F bonds.

In some embodiments, the coating composition comprises more than one reactive molecule that can react spontaneously with a polysilazane polymer backbone to cause fragmentation. In some embodiments, the coating composition comprises at least one reactive molecule that can react spontaneously with a polysilazane polymer backbone to cause fragmentation and at least one reactive nanomaterial.

Catalysts that may be used in the method, or with the assembly, of the invention may be selected from the list comprising, but not limited to, cross-linking catalysts and curing catalysts that are known to the skilled person.

In some embodiments, the method comprises the use of one or more catalysts selected from the following groups:

Nucleophiles and other catalysts which are capable of promoting a cross-linking reaction between a polysilazane Si—H and N—H to form stable Si—N bonds, such as catalysts selected from the group comprising, but not limited to, tetrabutylammonium fluoride (TBAF), tetrabutylammonium bromide (TBAB), tetrabutylammonium iodide (TBAI). These catalysts may also enhance reactivity of Si—H with nucleophiles.

Metal complexes capable of promoting hydrosilylation, cross-linking and other reactions between unsaturated centres and Si—H and/or N—H in a polysilazane, such as the platinum complex Karstedt's catalyst. Said unsaturated centres may comprise C=C, nitrile (carbon nitrogen triple bond), C=O, C=N, N=O, etc. Non-limiting examples of additives with unsaturated bonds include diphenylacetylene, 4-methyl-1-pentene, vinyl functionalised POSS, pentafluoropropionic anhydride, ethyleneimine. These may or may not react spontaneously and reactions may be in solution or post coating, depending on the type of catalyst. External activators may be applied during mixing, during coating application or post-coating.

In some embodiments, a catalyst is used that is a nucleophile which can activate a Si atom for nucleophilic attack, while at the same time promoting cross-linking of Si—H and N—H centres to avoid fragmentation of the polymer backbone. In some embodiments, an organic nucleophile is used. Organic nucleophiles facilitate easy use with polar aprotic or non-polar solvents. In some embodiments, metal complexes, such as platinum complexes, such as Karstedt's catalyst, is used as a catalyst, such as to promote solution cross-linking. In specific embodiments, 4,5-dicyano-pyridazine (DCP) is used as catalyst. In specific embodiments, TBAF is used as a catalyst.

It may be necessary to control the extent of solution cross-linking by quenching the catalyst with a quenching agent. Such a quenching agent must be chosen among compounds known by the person skilled in the art not to stabilise a precipitate.

In some embodiments, the method comprises the inclusion of one or more further components, such as additives, in the coating composition. The further component(s) may be pre-mixed with and added simultaneously with one or more of the components A, B, and/or C. The further component(s) may be added in one or more separate step i) sub-steps ix), such as before sub-step ia), such as between sub-steps ia) and ib), such as between sub-steps ib) and ic), such as after sub-step ic). The time period from the preceding sub-step to sub-step ix) may be referred to as $t_x$. In some embodiments, the method comprises the inclusion of more of one or more of the components that have already been added, such as component A, B, and/or C.

In some embodiments, such additives are included in order to enhance the properties of polysilazane and/or the coating composition and/or the coating or to impact new properties. In some embodiments, said additives are chosen from the list containing small molecules such as 2,2,3,3,3-pentafluoro-1-propanol, butanol, triethoxyvinylsilane. Functional groups such as hydroxyl groups and alkoxy groups in these additives will react with polysilazane. Such additives can be used to reduce friction and improve anti-stick property due to the (fluoro)alkyl groups, especially for coatings containing PHPS as the only polysilazane. Vinyl groups can participate in post-coating UV or thermal radical curing to further improve cross-linking, such as with Durazane 1800. In some embodiments, said additives are chosen from the list containing medium and long chain molecules, such as octanol, urethane acrylate methacrylate, erucamide. Such additives may function as described for the small molecules. The longer chain may also increase slip properties of the coating, as well as polymeric properties such as the flexibility of PHPS dominant coating. The hydroxyl group in butanol, the amine group and carbonyl group in euracamide, and the alkoxy ester group and NH in urethane acrylate may react with polysilazane. In some embodiments, said additives are chosen from the list containing polymers, such as cellulose or nanocellulose fibres with activated hydroxyl groups. These additives can be used as reinforcement agents (fillers) for improved mechanical property, e.g in biocomposites. Other additives known to the skilled person may also be included in the coating composition, such as thickeners, emulsifiers, dispersants, pigments, defoamers, leveling agents, photo-stabilisers, driers, drier accelerators, surfactants, flow modifiers, thixotropes. When such additives can react with and fragment polysilazanes, they are referred to and treated as reactive additives.

Reactive additives will typically react spontaneously with a polysilazane (mainly Si—H but in some cases, to some extent, N—H) due to the presence of certain functional groups. Non-limiting examples of such functional groups include hydroxyl, carbonyl, amine, carboxylic acid groups. Of particular note is hydroxyl, which is often present in commonly used additives. Unreactive additives need an activator in order to react, be it a chemical promoter or catalyst or an external activator. When activators are used, a cross-linking agent may be needed to avoid fragmentation. Due to the difference in reactivity of PHPS compared to OPSZ, an additive may be a reactive additive in a coating composition comprising PHPS but a non-reactive additive in a coating composition comprising OPSZ and no PHPS.

Examples of reactive additives that can be used in the method of the invention are compounds that promote cross-linking only post-coating due to their inherent properties— e.g., APTES needs to hydrolyse first in atmospheric moisture—or in the presence of an activator, e.g. radical initiators such as dicumyl peroxide (DCP), which requires heat, and photoiniators such as hydroxy cyclohexyl phenyl ketone (HCPK).

The coating composition further comprises one or more solvents. The concentration of the various components can be varied in order to control properties of the coating composition and/or the coating. In some embodiments, the concentration of the components in the coating composition vessel do not exceed 50 wt %. In some embodiments, the concentration of the components in the coating composition is between 2 and 20 wt %. The solvent may be a polar aprotic solvent and/or a non-polar solvent. The solvent may be an anhydrous solvent. In some embodiments, all components are completely dissolved or suspended as a stable suspension before their introduction into the coating composition vessel. In other embodiments, one or more liquid components is introduced neat, i.e. without the presence of a solvent, into the coating composition vessel, whereas all other components are completely dissolved or suspended as a stable suspension before their introduction into the coating composition vessel. In some embodiments, all components are dissolved or suspended in the same solvent. In other embodiments, different solvents are used for two or more of the components. In some embodiments, a solvent is chosen from the list comprising, but not limited to, dimethyl sulfoxide (DMSO), butyl acetate, tetrahydrofuran (THF), dimethylformamide (DMF), dibutyl ether, xylene. In preferred embodiments, coating compositions comprising little (such as 5 wt %, such as 2 wt %, such as 1 wt %) or no PHPS, only OPSZ, comprise solvents selected from the list of polar aprotic solvents such as DMSO, butyl acetate, tetrahydrofuran, DMF. In preferred embodiments, coating compositions comprising substantial amounts of PHPS comprise only non-polar solvents such as dibuthyl ether, xylene.

In some embodiments, particularly embodiments for which the skilled person would recognise the need for or advantage of this, anhydrous conditions are used.

In some embodiments, the components are introduced gradually, slowly, such as not batchwise.

The time periods between the sub-steps of step i), i.e. $t_c$ as well as any time period $t_x$ from a step i) sub-step to the introduction of an additional component in an additional step i) sub-step ix) following immediately after said step i) sub-step, the chosen groups for components A, B, and C, and any additional component, and the time period $t_{ii}$ between step i) and step ii) are all chosen based on the known reactivities of the components of the coating composition towards each other, in order to control the extent of any reactions taking place between components of the coating composition. The time periods and order of the groups chosen for the components are predetermined in order to allow any desired reactions to take place in the coating composition and/or to avoid any precipitation and/or undesired reactions and/or to limit the extent of reactions between components taking place in the coating composition vessel. For example, a component known by the person skilled in the art to cause fragmentation of the polysilazane may be introduced after the introduction of the polysilazane. The time from the introduction of such a component to step ii) may be as short as allowable by the coating device, or it may be selected so that it is shorter than the time it takes for a certain degree of fragmentation to be reached. A component known to stabilise the polysilazane, such as by preventing or reversing fragmentation, may be introduced before the introduction of the polysilazane. A component known to induce a desired reaction among the nanomaterials may be introduced before or together with the nanomaterials, and before the introduction of the polysilazane and the catalyst, in order for the desired nanomaterial reaction to take place without interference from other components. The time period before the introduction of the latter components may be selected so that it is sufficient for the desired reaction to take place. A cross-linking catalyst may be introduced a certain time period before the application of the coating to allow a desired degree of solution cross-linking to take place in the coating composition vessel in order to decrease the dry-to-touch time of the coating, but the time period should be limited so that excessive cross-linking is avoided, as the latter may affect desirable properties of the coating or cause precipitation.

Excessive reaction is relative in this context. For example, too much solution cross-linking may lead to formation of nano or micro particles, aggregates or hybrids which can lead to high surface roughness. For certain uses high surface roughness is desirable, such as for camouflaged coatings which need not be glossy, and porous coatings for filtration uses. For certain other uses, e.g high gloss and fouling resistant superhydrophobic coatings, surface roughness should be kept low, for example below 400 nm, such as below 200 nm, preferably below 100 nm.

In some embodiments, the choice of group for each of the components, as well as the predetermination of $t_c$ and $t_{ii}$, is made based on the known reactivity of the components of the coating composition towards each other in order to allow any desired reactions, such as solution cross-linking to take place in the coating composition to the desired degree. In some embodiments, the choice of group for each of the components, as well as the predetermination of $t_c$ and $t_{ii}$, is made based on the known reactivity of the components of the coating composition towards each other in order to avoid any precipitation in the coating composition, such as any precipitation known to the skilled person to occur in such coating compositions. In some embodiments, the choice of group for each of the components, as well as the predetermination of $t_c$ and $t_{ii}$, is made based on the known reactivity of the components of the coating composition towards each other in order to avoid or limit undesired reactions that is known to the skilled person to take place in the coating composition, such as fragmentation. In some embodiments, the choice of group for each of the components, as well as the predetermination of $t_c$ and $t_{ii}$, is made based on the known reactivity of the components of the coating composition towards each other in order to limit the extent of reactions between components taking place in the coating composition vessel, such as solution cross-linking.

The time periods $t_c$ and $t_{ii}$, as well as any time period $t_x$ from a step i) sub-step to the introduction of an additional component in an additional step i) sub-step ix) following immediately after said step i) sub-step, the chosen groups for components A, B, and C, and any additional component, may be the same or different. In some embodiments, $t_c$ and/or $t_x$ is 0 seconds, meaning that the components of these steps are introduced into the coating composition vessel simultaneously. When components are to be introduced simultaneously, they may be contacted and/or mixed with each other before introduction into the coating composition vessel, or they may only be contacted with each other once they are in the coating composition vessel.

In some embodiments, $0 < t_c < 1200$ seconds and/or $1 < t_{ii} < 1200$ seconds. In some embodiments, $0 < t_c < 900$ seconds and/or $1 < t_{ii} < 900$ seconds. In some embodiments, $0 < t_c < 600$ seconds and/or $1 < t_{ii} < 600$ seconds. In some embodiments, $0 < t_c < 400$ seconds and/or $1 < t_{ii} < 400$ seconds. In some embodiments, $0 < t_c < 300$ seconds and/or $1 < t_{ii} < 300$ seconds. In some embodiments, $0 < t_c < 180$ seconds and/or $1 < t_{ii} < 180$ seconds. In some embodiments, $0 < t_c < 120$ seconds and/or $1 < t_{ii} < 120$ seconds. In some embodiments, $0 < t_c < 60$ seconds and/or $1 < t_{ii} < 60$ seconds. In some embodiments, $0 < t_c < 30$ seconds and/or $1 < t < 30$ seconds. In some embodiments, $5 < t_c < 60$ seconds and/or $5 < t_{ii} < 60$ seconds. In some embodiments, $0 < t_x < 900$ seconds. In some embodiments, $0 < t_x < 300$ seconds. In some embodiments, $0 < t_x < 120$ seconds. In some embodiments, $5 < t_x < 60$.

In some embodiments, $t_c$ controls the level of fragmentation of the polysilazane and $t_i$ controls the level of solution cross-linking.

In some embodiments, component A is chosen from the group of polysilazanes, component B is chosen from the group of catalysts, and component C is chosen from the group of reactive nanomaterials or the group of reactive nanomaterials and reactive molecules that can react spontaneously with a polysilazane polymer backbone to cause fragmentation.

In some embodiments, component A is chosen from the group of polysilazanes, component B is chosen from the group of reactive nanomaterials or the group of reactive nanomaterials and reactive molecules that can react spontaneously with a polysilazane polymer backbone to cause fragmentation, and component C is chosen from the group of catalysts.

In some embodiments, component A is chosen from the group of polysilazanes, component B is chosen from the group of reactive nanomaterials or the group of reactive nanomaterials and reactive molecules that can react spontaneously with a polysilazane polymer backbone to cause fragmentation, and component C is chosen from the group of catalysts.

In some embodiments, component A is chosen from the group of reactive nanomaterials and/or reactive nanomaterials and reactive molecules that can react spontaneously with a polysilazane polymer backbone to cause fragmentation, component B is chosen from the group of polysilazanes, and component C is chosen from the group of catalysts.

In some embodiments, component A is chosen from the group of reactive nanomaterials and/or reactive nanomaterials and reactive molecules that can react spontaneously with a polysilazane polymer backbone to cause fragmentation, component B is chosen from the group of catalysts, and component C is chosen from the group of polysilazanes.

In some embodiments, component A is chosen from the group of catalysts, component B is chosen from the group of reactive nanomaterials and/or reactive nanomaterials and reactive molecules that can react spontaneously with a polysilazane polymer backbone to cause fragmentation, and component C is chosen from the group of polysilazanes.

In some embodiments, component A is chosen from the group of catalysts, component B is chosen from the group of polysilazanes, and component C is chosen from the group of reactive nanomaterials and/or reactive nanomaterials and reactive molecules that can react spontaneously with a polysilazane polymer backbone to cause fragmentation.

FIG. 2 illustrates an embodiment of the method of the invention, wherein additional components X are introduced in a sub-step ix) a time period $t_x$ after sub-step ib), and further comprising a curing step iii).

In some embodiments, the choices of the sub-steps of step i) are as follows; each sub-step performed separated in time from the others:

Sub-step ia) Component A is a nanomaterial that comprise functional units that can fragment or couple to a polysilazane, such as through a π-π interaction, such as boron nitride, graphene, a carbon nanotube, WS$_2$, MOS$_2$.

Pre-mixed with and introduced simultaneously with component A there may be a catalyst that prevents or reverses fragmentation, such as a nucleophile, a metal complex, DCP; and/or a small amount of OPSZ, such as Durazane 1800.

Such catalysts are also capable of solution cross-linking of polysilazane, so their concentration may need to be minimised initially. The catalyst is present because 1) nanomaterials and/or their functional groups are not sensitive towards the catalyst, and 2) the functional groups present on the nanoparticles are sensitive towards each other. A catalyst, e.g. Karstedt's catalyst, can cause nanomaterials that comprise nitrile and/or vinyl groups to aggregate, either by covalent interaction or by weak unsaturated bond coupling, thus instilling some self-assembly.

The presence of a small amount of OPSZ may stabilise certain nanomaterials, such as graphene oxide, carbon nanotubes, hexagonal boron nitride, WS2. These nanomaterials are known to be stabilised in solution through covalent or non-covalent functionalisation by organic molecules, such as organic molecules bearing unsaturated bonds.

Sub-step ix) Additional step. Introduced in this step are catalysts for solution cross-linking, such as TBAF, TBAB, and/or TBAI; and/or additives, such as for maintaining colloidal stability further along in the process, which are not sensitive towards the components of sub-step ia) but could interfere with any reaction/the pre-mixing between these components.

Sub-step ib) Component B is one or more polysilazanes.

Pre-mixed with and introduced simultaneously with component B there may be unreactive additives, such as traditional additives used to improve coating properties, e.g thickeners, emulsifiers, dispersants, pigments, defoamers, leveling agents, photo-stabilisers, driers, drier accelerators, surfactants, flow modifiers, thixotropes, and/or reactive additives that will need an external trigger, such as UV light, to react, such as after application of the coating.

Sub-step ic) Component C is a cross-linking catalyst.

Pre-mixed with and introduced simultaneously with component C there may be reactive additives; and/or unreactive additives.

In certain embodiments, the catalyst in ia) is the same as the catalyst in ib). In certain embodiments, the catalyst in ia) is different from the catalyst in ib). In certain embodiments, the catalyst in ia) primarily promotes nanomaterial self-assembly/aggregation while the catalyst in ib) primarily promotes nanomaterial-polysilazane reaction and solution cross-linking.

When the method is performed using continuous flow, it is possible to dilute the flow before sub-step ib), such as in order to reduce catalyst concentration and thus reduce solution cross-linking, such as in order to reduce the concentration of another component. The terms "dilute" and "dilution" as used herein refer to the addition of more solvent to the coating composition. It is also possible to dilute the flow before step ii), such as for improving application. In some embodiments, a diluent is added in an extra sub-step iy) directly before or directly after sub-step ix), or it is added in sub-step ix). The diluent may be a polar aprotic or non-polar solvent. It may or may not be the same as a solvent that is already present in the coating composition. For coating compositions comprising significant amounts of PHPS, a preferred diluent is dibutyl ether.

In some embodiments, the extent of solution cross-linking is controlled by quenching the catalyst. The quenching may be performed by the introduction into the coating composition vessel of a quenching agent known by the skilled person to quench the catalyst, and to not promote precipitation. Such a quenching agent may be introduced in a separate sub-step iz), after sub-step ic). In some embodiments, the quenching agent is calcium borohydride bis(tetrahydrofuran), which can quench TBAF, added in an amount that does not lead to significant precipitation.

In some embodiments, the components are chosen as follows:

Sub-step ia) Component A is PHPS.

Pre-mixed with and introduced simultaneously with component A there may be non-reactive additives.

Sub-step ib) Component B is catalyst TBAF or TBAB.

Sub-step ic) Component C is a reactive molecule that can react spontaneously with a polysilazane polymer backbone to cause fragmentation. Sub-step ic) is performed simultaneously with substep ib), and components B and C may be pre-mixed.

In these embodiments, the coating may be a scratch resistant, optical coating with high gloss and/or non-stick properties, such as anti-fingerprint. The time period $t_{ii}$ must be long enough to allow the desired level of solution cross-linking and/or further reaction with component C, but not so long that precipitation and/or unwanted surface roughness results.

An additional advantage of these embodiments is that surface roughness of the resultant coating can in part be modulated by varying the extent of the solution cross-linking.

In similar embodiments, some or all of the PHPS is replaced by OPSZ. In these embodiments, the hardness of the resulting coating is lower, the coating is more hydrophobic and more flexible, and its non-stick properties are enhanced.

In similar embodiments, the components are chosen as follows:

Sub-step ia) Component A is catalyst DCP. Pre-mixed with and introduced simultaneously with component A is TBAF.

Sub-step ib) Component B is a reactive molecule that can react spontaneously with a polysilazane polymer backbone to cause fragmentation. Sub-step ic) is performed simultaneously with substep ib), and components B and C may be pre-mixed.

Sub-step ic) Component C is PHPS and Durazane 1800. Pre-mixed with and introduced simultaneously with component A there may be non-reactive additives.

In some embodiments, the choices of components for the sub-steps of step i) are as follows; each sub-step performed separated in time from the others:

Sub-step ia) Component A is a nanomaterial that comprises functional units that can fragment polysilazane.

Pre-mixed with and introduced simultaneously with component A there may be reactive or non-reactive additives, such as Karstedt's catalyst, such as a stabilising agent;

Sub-step ix) Additional step. Introduced in this step are TBAF or TBAB; and/or non-reactive additives.

Sub-step ib) Component B is PHPS and OPSZ.

Pre-mixed with and introduced simultaneously with component B there may be unreactive additives, such as a non-ionic surfactant.

Sub-step ic) Component C comprises the catalysts TBAF and DCP.

In these embodiments, Karstedt's catalyst may be added in ia) in order to induce a transformation, such as aggregation, among the nanomaterials before they encounter the polysilazanes in ib). While TBAF or TBAB can help incorporate nanomaterials into polysilazanes via covalent bonding, it will also promote solution cross-linking in the polysilazanes, which may be faster than the reaction with nanomaterials. The stepwise introduction and chosen order of the components in these embodiments gives the nanomaterials a "head start" ahead of cross-linking. Post-coating, DCP may induce cross-linking/reaction of vinyl group on Durazane 1800 and/or any other unsaturated bond present with Si—H (e.g. with application of heat). Addition of DCP in sub-step ix) may be useful if it is necessary to limit its amount in ia).

The reactive additive in ia) may be a polysilazane, such as OPSZ, in an amount substantially smaller than the amount in ib). If a polysilazane is added in i), TBAF may not be necessary in ia) because intentional fragmentation of the polysilazane is needed to generate more fragments to react with nanomaterials. These fragments may be brought back to polymer backbone later with TBAF, TBAB or any other suitable nucleophilic catalyst.

An additional advantage of these embodiments is that the surface roughness of the resultant coating can be enhanced with nanomaterials. E.g., superhydrophobicity may be approached or attained using nanomaterials such as silica, titanium dioxide, POSS. The combination of surface roughness and hydrophobicity is vital to attain superhydrophobicity.

The method of the invention may be employed even if no reactive nanomaterial is used, using only a polysilazane and a solution cross-linking catalyst, and optionally unreactive additives. The method then works to promote solution cross-linking for optimising coating properties and reducing post-coating processing time. The coating composition is then applied a predetermined time period after the mixing of the polysilazane and the catalyst. For example, the solution cross-linking of OPSZ may lead to formation of stable nano/micro particles ($SiO_2$-organic hybrid) which will affect coating surface roughness. The higher the amount of this cross-linking, the higher the surface roughness, which may be desirable for certain coating applications. Solution cross-linking also decreases post-coating curing times since the functional groups cross-linked in solution do not need to be cross-linked post-coating. Thus, for a given time and set of curing conditions, solution cross-linking can also lead to higher coating hardness and wear resistance.

The method of the invention can be performed at any temperature compatible with the components of the coating. In some embodiments, the method is performed at room temperature.

The step of applying the coating composition to a substrate may be performed using any technique known to the skilled person for applying solution processed materials, such as by a method selected from the list comprising but not limited to, spraying; such as ultrasonic spray coating, such as spray painting, such as pneumatic spraying; spin coating; inkjet printing; doctor-blade, electrospinning, and other processes known in the art for transforming solution processed chemical compositions into coatings or membranes at low temperatures. The step of applying the coating composition in a continuous flow process may in particular benefit from roll-to-roll processing, e.g involving processes such as spraying, inkjet, electrospinning.

In some embodiments, the application is performed by spraying, such as by ultrasonic spray coating. Ultrasonic spray coating displays unique advantages in minimising material loss, achieving uniform coating over large area in short time via atomisation of coating formulation and uniformly distributing coating components, compatibility with in-line processing (e.g roll-2-roll) and optimising surface roughness of the coating. Furthermore, the intensity of the ultrasonic wave in the nozzle can be used to speed up solution reactions, such as cross-linking, just before spraying.

In some embodiments, the substrate is activated before the application of the coating composition provided according to the invention, such as to improve adhesion of the coating to the substrate, such as on polymer and/or plastic substrates. Such activation may be performed using any method known to the skilled person, such as UV treatment, plasma treatment, chemical activation.

In some embodiments, the coating provided using the method or assembly according to the invention adheres to the substrate by covalent bonds. In other embodiments, the coating provided using the method or assembly according to the invention is a free-standing membrane. In some embodiments, the coating provided using the method or assembly according to the invention is a one-layer coating. In other embodiments, the coating provided using the method or assembly according to the invention forms part of a multi-layer coating, such as a multi-layer coating comprising more than one coating layer provided using the method or assembly according to the invention, such as a multi-layer coating comprising one coating layer provided using the method or assembly according to the invention.

In another aspect, the invention provides an assembly for performing the method of the invention.

In some embodiments, as illustrated in FIG. 3, the invention provides an assembly 100 for performing the method of the invention, comprising an elongate coating composition vessel (110) having a first end (121) and a second end (122), where the first and second ends are arranged opposite each other, the elongate coating composition vessel comprising a first inlet port (131), a second inlet port (132), arranged closer to the second end than the first inlet port, a third inlet port (133), arranged at a distance (D) from the second inlet port and closer to the second end than the second inlet port, and an applicator port (141), arranged at a distance (D') from the third inlet port and closer to the second end than the third inlet port;

an applicator (150) connected to the applicator port so that fluid connection is provided between the applicator and the elongated coating composition vessel; and a pressure generator (161), configured to generate a pressure, where the pressure generator is connected directly or indirectly to the first inlet port in order to create a pressure difference between the first inlet port and the applicator port.

Figure 4:
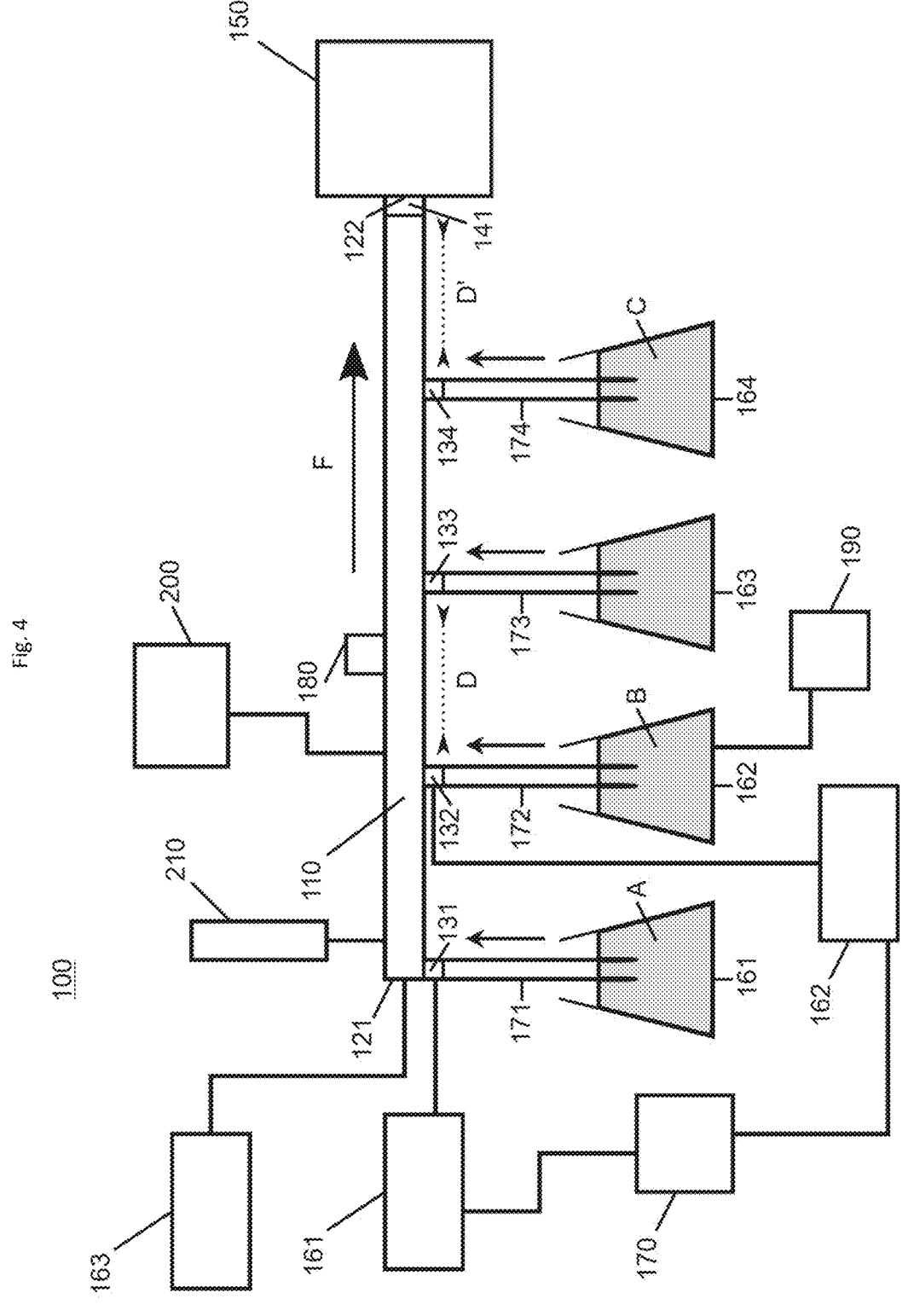
FIG. 4 is a schematic representation of an embodiment of the assembly according to the invention.

FIG. 4 illustrates an example of an assembly 100 according to the invention. The features of the example of FIG. 4 are presented below.

In some embodiments, the coating composition vessel further comprises a fourth inlet port (134). In some embodiments, the coating composition vessel comprises further additional inlet ports, such as five inlet ports, such as six inlet ports.

Each of the inlet ports (131, 132, 133, 134) is attachable to a container (161, 162, 163, 164) for one or more components for a coating composition so that fluid connection is provided between the coating composition vessel and the container. In some embodiments, each of the inlet ports is attached to a container. The inlet port may be directly attachable to the container and/or attachable via a connector (171, 172, 173, 174). In some embodiments, the connector is a tube or a pipe. In some embodiments, the assembly further comprises such containers (161, 162, 163, 164) and/or such connectors (171, 172, 173, 174), such as one for each inlet port. In some embodiments, one or more of the inlet ports comprises a valve for sealing and opening the inlet port in order to control the existence of a fluid connection between the coating composition vessel and a container. In some embodiments, one or more of the inlet ports comprises a means for gradual and/or slow introduction of a component into the coating composition vessel, such as to avoid a concentration spike which could cause excessive reaction, e.g precipitation.

When in use, each of said containers (161, 162, 163, 164) may contain components for a coating composition. In some embodiments, each of the containers may contain all components that are to be introduced in a certain step i) sub-step (ia), ib), ic), ix)) of the method of the invention, or all components that are to be introduced a certain point in time. When sub-steps of step i) of the method are to be performed simultaneously, the components for the sub-steps to be performed simultaneously may be contained in the same container. The containers may be easily replaceable.

The number of inlet ports and containers may be chosen based on the number of components to be introduced into the coating composition vessel at different times.

In some embodiments, at least one container is divided into sub-containers that are connected, such as via tubes or via pipes, to the container. The sub-containers may be easily replaceable. In some embodiments, sub-containers are used for controlled pre-mixing, in a container, of two or more components before introduction into the coating composition vessel, e.g. because the mixing of said components takes too long to be compatible with the total time of the coating composition spent in the vessel, or because an external activator is necessary for the mixing of said components.

A pressure generator (161), configured to generate a pressure, is connected to the first inlet port (131). It may be connected directly to the first inlet port, or it may be connected indirectly to the inlet port such as connected to a container (161) connected to the inlet port or connected to a connector (171) connecting the container and the inlet port. In some embodiments, the assembly further comprises an additional pressure generator (162), configured to generate a pressure, where the second pressure generator is connected directly or indirectly to the second (132) or third inlet port (133). In some embodiments, a pressure generator is connected, directly or indirectly, to each of the inlet ports of the coating composition vessel.

In some embodiments, each pressure generator is selected from the list comprising a pump, a piston, a gas container. In some embodiments, each pressure generator is a pump, such as a peristaltic pump. Each pressure generator is arranged to create a pressure difference between the inlet port to which is it directly or indirectly connected and the applicator port (141). Thus, in use, the pressure generator leads a component present in a container connected to said inlet port to be introduced into the coating composition container. The pressure generator may further generate a flow (F) of coating composition that goes through the coating composition vessel from said inlet port to the applicator port. In some embodiments, an additional pressure generator (163) is connected directly to the coating composition vessel near the first end (121) and at a distance from the inlet ports, for further generating a flow of coating composition through the coating composition vessel.

In some embodiments, the assembly further comprises a controller (170). In certain embodiments, the controller is for controlling an inlet port, such as for controlling a valve on an inlet port. In certain embodiments, the controller is for controlling one or more pressure generators, such as for controlling the pressure difference created by a pressure generator. The controller may ensure the desired introduction rate of components and/or the flow rate of the coating composition through the coating composition vessel to the applicator port and the applicator. The length and diameter of the coating composition vessel and the flow rate of the coating composition are chosen to obtain the desired length of the time periods, such as $t_c$, such as $t_x$, such as $t_{ii}$, of the method of the invention. In some embodiments, the distance D and/or the distance D' is adjustable.

The relative proportions of the components in the coating composition vessel may be controlled by their concentrations and their relative flow rates.

In some embodiments, the controller controls the intake of coating composition components from different containers, such as via connectors, into the coating composition vessel via the inlet ports, thus ensuring that a step-wise, time-controlled and gradual and/or slow introduction and mixing of the components of the coating composition is obtained, and the coating composition is subsequently applied to a substrate using the applicator.

The applicator is suitable for applying a coating composition, such as a coating composition contained in the assembly (100), to a substrate. In some embodiments, the applicator is a spray nozzle, such as a spray nozzle for ultrasonic spray coating. In other embodiments, the applicator is selected from the list comprising, but not limited to an inkjet printer, an electrospinner, a doctor blade, or any appropriate film applicator.

In some embodiments, the assembly is specifically adapted for use with components that are known by the skilled person to be reactive towards air and/or moisture.

In some embodiments, the assembly further comprises a pressure relief device (180), such as a gas release device, such as a pressure relief valve, connected to the coating composition vessel, such as via a pressure relief port on the coating composition vessel. Such pressure relief device may be used if a gas-forming reaction takes place in the coating composition, to release the formed gas.

In some embodiments, the assembly further comprises one or more sensors (190), such as in or on the coating composition vessel, such as in or on a container. The sensor may be a sensor for monitoring process conditions and/or the extent of a reaction, such as a cross-linking reaction, such as a fragmentation. The sensor may be selected from the list comprising, but not limited to, optical sensors, pressure sensors, temperature sensors.

Figure 5:
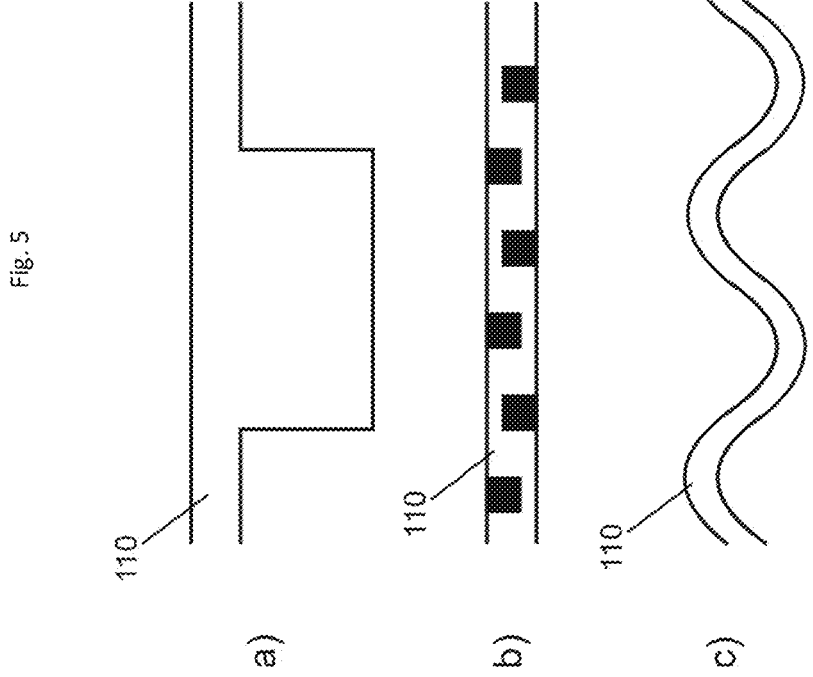
FIG. 5 is a schematic representation of mixing means; a) flow redirecting barriers (FRB); b) a coiled flow path (CFP); c) an abrupt increase in the diameter, of the coating composition vessel.

In some embodiments, the assembly further comprises one or more mixing means (200), such as in or on the coating composition vessel, such as in or on a container. Non-limiting examples of a mixing means comprise an ultrasonication device, a stirrer, flow redirecting barriers (FRB) in the coating composition vessel, a coiled flow path (CFP) in the coating composition vessel, an abrupt increase in the diameter of the coating composition vessel. Examples of flow redirecting barriers (FRB), a coiled flow path (CFP), and an abrupt increase in the diameter of the coating composition vessel are shown in FIGS. 5a, 5b, and 5c, respectively. In some embodiments, ultrasonication may lead to excessive reaction and/or precipitation, and thus in these embodiments, FRB, CFP, and/or stirring is preferred.

In some embodiments, the assembly further comprises one or more activators (210), such as in or on the coating composition vessel, such as in or on a container. Non-limiting examples of an activator comprise a device for applying to the coating composition electromagnetic radiation, (e.g. UV-visible light, ultrasonic wave), plasma, laser, heat, sonication, ultrasonication.

In some embodiments, the invention provides an assembly for performing the method of the invention, comprising an elongate coating composition vessel (110) having a first end (121) and a second end (122), where the first and second ends are arranged opposite each other, the elongate coating composition vessel comprising a first inlet port (131), a second inlet port (132), arranged closer to the second end than the first inlet port, and an applicator port (141), arranged at a distance (D') from the second inlet port and closer to the second end than the second inlet port;

the vessel containing a component for a coating composition; an applicator (150) connected to the applicator port so that fluid connection is provided between the applicator and the elongated coating composition vessel; and a pressure generator (161), configured to generate a pressure, where the pressure generator is connected directly or indirectly to the first inlet port in order to create a pressure difference between the first inlet port and the applicator port.

The embodiments and features described in the context of one aspect, e.g. for the aspect directed to the method, also apply to all other aspects of the invention, e.g. the assembly.

The invention shall not be limited to the shown embodiments and examples. While various embodiments of the present disclosure are described herein, it will be obvious to those skilled in the art that such embodiments are provided by way of example only. Numerous modifications and changes to, and variations and substitutions of, the embodiments described herein will be apparent to those skilled in the art without departing from the scope of the present invention. It is to be understood that various alternatives to the embodiments described herein can be employed in practicing the disclosure. Further, it is contemplated that the appended claims will cover such modifications and variations that fall within the true scope of the invention.

It is to be understood that every embodiment of the disclosure can optionally be combined with any one or more of the other embodiments described herein.

It is to be understood that each component, compound, or parameter disclosed herein is to be interpreted as being disclosed for use alone or in combination with one or more of each and every other component, compound, or parameter disclosed herein. It is further to be understood that each amount/value or range of amounts/values for each component, compound, or parameter disclosed herein is to be interpreted as also being disclosed in combination with each amount/value or range of amounts/values disclosed for any other component(s), compound(s), or parameter(s) disclosed herein, and that any combination of amounts/values or ranges of amounts/values for two or more component(s), compound(s), or parameter(s) disclosed herein are thus also disclosed in combination with each other for the purposes of this description. Any and all features described herein and combinations of such features are included within the scope of the present invention provided that the features are not mutually inconsistent.

It is to be understood that each lower limit of each range disclosed herein is to be interpreted as disclosed in combination with each upper limit of each range disclosed herein for the same component, compound, or parameter. Thus, a disclosure of two ranges is to be interpreted as a disclosure of four ranges derived by combining each lower limit of each range with each upper limit of each range. A disclosure of three ranges is to be interpreted as a disclosure of nine ranges derived by combining each lower limit of each range with each upper limit of each range, etc. Furthermore, specific amounts/values of a component, compound, or parameter disclosed in the description or an example is to be interpreted as a disclosure of either a lower or an upper limit of a range and thus can be combined with any other lower or upper limit or a range or specific amount/value for the same component, compound, or parameter disclosed elsewhere in the application to form a range for that component, compound, or parameter.

EXAMPLES

Experiment 1a, 1b, 1c
Coating Composition:
  10 wt % PHPS
  5 wt % TBAB
  45 wt % acetone
  40% dibutyl ether (solvent)
Choice of Component Groups and Specific Components:
  Sub-step ia) Component A: Reactive molecule that can react spontaneously with a polysilazane polymer backbone to cause fragmentation; acetone.
  Sub-step ib) Component B: Catalyst TBAB (dissolved in acetone).
  Sub-step ic) Component C: Polysilazane PHPS (dissolved in dibutyl ether).
  The components were mixed, stepwise, in a beaker.
Application Method, Step ii): Drop Cast and Spreading.
Time Periods:
  $T_c$=60 seconds.
  Experiment 1a: $T_{ii}$=300 seconds. Experiment 1b: $T_{ii}$=600 seconds. Experiment 1c: $T_{ii}$=1200 seconds.
Results:
  Experiments 1a, 1b, and 1c differ from each other in that $t_{ii}$ was varied. For each of the experiments 1a, 1b, and 1c, corresponding control experiments without TBAB were also performed.

The coatings resulting from the experiments were evaluated by visual inspection, and by manual scratch-tests with a glass cutter and a copper tip for evaluation of hardness.

Acetone was used both as a solvent and as a reactant. Acetone was in excess because TBAB was dissolved in acetone, and therefore the concentration of TBAB was also kept high.

Experiment 1a, with the shortest $t_i$ of 300 seconds, gave a much thicker coating than the corresponding control experiment without TBAB. The surface roughness was much higher when too much coating fluid was applied. The coating composition was far less viscous when TBAB was not used, so that coating thickness could not be increased, and its viscosity decreased with time.

Experiment 1b, with $t_{ii}$=600 seconds, gave a coating with increased surface roughness and hardness compared to experiment 1c.

Experiment 1c, with $t_{ii}$=1200 seconds, gave a very high coating hardness (scratch resistance). It was difficult to obtain a thin film with it because of high cross-linking leading to more a viscous composition with time, but the thinner part of the coating showed very high scratch-resistance. The corresponding control experiment without TBAB did not result in a film.

The vast difference in yield, i.e. in coating thickness, between the catalysed and uncatalysed reactions indicates that solution cross-linking leading to higher yield works in the presence of fragmentation. In experiment 1c, the composition of the control experiment did not form a film. It is likely that, in the presence of high amount of reactive component (acetone), the dropcast formulation mainly consisted of solvent, volatile fragments, non-cross-linking fragments, and acetone-PHPS reaction product.

In a further set of experiments, mirroring experiments 1a-c acetone was replaced with isopropanol. In these experiments, scratch resistance decreased, indicating the stronger effect on fragmentation by the hydroxyl groups.

Experiments 2a, 2b, 2c

Coating Composition:

9.5 wt % PHPS 9 wt % Durazane 1800

4.5 wt % TBAB 40 wt % acetone

37% dibutyl ether (solvent)

Choice of Component Groups and Specific Components:

Sub-step ia) Component A: Reactive molecule that can react spontaneously with a polysilazane polymer backbone to cause fragmentation; acetone.

Sub-step ib) Component B: Catalyst TBAB (dissolved in acetone).

Sub-step ic) Component C: Polysilazanes PHPS and Durazane 1800 (dissolved in dibutyl ether).

The components were mixed, stepwise, in a beaker.

Application Method, Step ii): Drop Cast and Spreading.

Time Periods:

$T_c$=60 seconds.

Experiment 2a: $T_{ii}$=300 seconds. Experiment 2b: $T_{ii}$=600 seconds. Experiment 2c: $T_{ii}$=1200 seconds.

Results:

Experiments 2a, 2b, and 2c differ from each other in that $t_{ii}$ was varied. For each of these, control experiments without TBAB were also performed. For each of the experiments 2a, 2b, and 2c, corresponding control experiments without TBAB were also performed.

The coatings resulting from the experiments were evaluated by visual inspection, and by manual scratch-tests with a glass cutter and a copper tip for evaluation of hardness.

The same effects were seen in these experiments as in experiments 1a-c with regards to yields and hardness as a function of time. However, for all $t_c$'s, the coatings in experiments 2a-c were less hard than in the corresponding 1a-c, as well as smoother (low surface roughness). The lower hardness and surface roughness can be attributed to the presence of organic polysilazane Durazane 1800, which likely limited the extent of cross-linking and/or the formation of the hard (non-flexible) inorganic component of the coatings.

Conclusions:

The results from experiments 1 and 2 highlight the importance of the time periods from mixing to application of the coating composition: The hardness increased markedly as $t_{ii}$ was increased. The surface roughness also increased with increasing cross-linking time, i.e. with increasing $t_{ii}$, but this effect could be counter-acted by the addition of organic polysilazane. It is also noteworthy that without catalyst, no film was formed after 1200 seconds, as could be seen by visual observation.

Planned Experiment I—Coating for Improving Scratch and Fouling Resistances

Coating composition (minus solvent):

60-80 wt % Durazane 1033 (OPSZ with no only methyl as pendant groups)

5-10 wt % Durazane 1800

3-10 wt % APTES

In wt % based on the total weight of polysilazane and APTES:

1-4 wt % acrylic resin (e.g PARALOID® B-44)

0.5-4 wt % surfactant TEGO® Phobe 1505

2-10 wt % 2,2,2-trifluoroethanol 0.5-5 wt % TBAB

Percentage of Coating Components with Respect to Solvent (n-Butyl Acetate): 2-20 wt %

Choice of Component Groups and Specific Components:

Sub-step ia) Component A: Catalyst TBAB.

Sub-step ib) Component B: Reactive molecules that can react spontaneously with a polysilazane polymer backbone to cause fragmentation; APTES and 2,2,2-trifluoroethanol.

Sub-step ic) Component C: The polysilazanes described above.

Further components, pre-mixed with and introduced simultaneously with component C: Acrylic resin, surfactant Application Method, Step ii): Ultrasonic Spray Coating.

Time Periods:

$T_c$=5-60 seconds.

$T_{ii}$=5-300 seconds.

Additional Curing Step iii): Inline UV Curing with $H_2O_2$ Vapour.

Planned Experiment II—Coating for Improving Scratch Resistance and Hydrophobicity Coating Composition (Minus Solvent):

20-30 wt % Durazane 1800

50-65 wt % OPSZ other than Durazane 1800

5-30 wt % OH, nitrile and/or vinyl functionalised silica and/or TiO2

In wt % based on the total weight of the above:

0.0025-1 wt % TBAF or TBAB 0.5-15 wt % of hexane-1,6 diol diacrylate (HDC)

1-10 wt % of HCPK 2-10 ppm of Karstedt's catalyst

Percentage of Coating Components with Respect to Solvent (DMSO): 5-40 wt %

Choice of Component Groups and Specific Components:

Sub-step ia) Component A: Catalyst TBAF or TBAB.

Further components, pre-mixed with and introduced simultaneously with component A: HCPK, HDC.

Sub-step ib) Component B: Nanomaterial $SiO_2$ and/or $TiO_2$.

Further component, pre-mixed with and introduced simultaneously with component B: Karstedt's catalyst.

Sub-step ic) Component C: The polysilazanes described above.

Application Method, Step ii): Ultrasonic Spray Coating.

Time Periods:

$T_c$=5-60 seconds.

$T_{ii}$=5-300 seconds.

Additional Curing Step iii): Inline UV Curing with $H_2O_2$ Vapour.

Planned Experiment III—Coating for Low Friction and Wear Application

Coating Composition (Minus Solvent):

20-80 wt % PHPS 10-40 wt % Durazane 1800

10-40 wt % OPSZ other than Durazane 1800

In wt % based on the total weight of the above:

0.5-10 wt % graphene oxide with one or more of OH, carbonyl and epoxy functional groups 0.5-5 wt % 2-fluoroethanol 0.005-0.5 wt % TBAF or TBAB Percentage of Coating Components with Respect to Solvent (Dibutyl Ether): 2-40 wt %

Choice of Component Groups and Specific Components:

Sub-step ia) Component A: Nanomaterials graphene oxide as described above;

one or more of $WS_2$, $MoS_2$, hexagonal boron nitride as described above.

Further components, pre-mixed with and introduced simultaneously with component A: PEGD.

Sub-step ib) Component B: Catalyst TBAF or TBAB.

Further components, pre-mixed with and introduced simultaneously with component B: HDC and/or DCP; 2-fluoroethanol; euracamide.

Sub-step ix) Durazane 1800

Sub-step ic) Component C: PHPS and OPSZ as described above.

Application Method, Step ii): Ultrasonic Spray Coating.

Time Periods:

$T_x$ (between ib) and ix): 5-60 seconds.

$T_c$=5-60 seconds.

$T_{ii}$=5-100 seconds.

Additional Curing Step iii): Curing with UV Light; Inert or Ambient Surroundings; 80-600° C.

The invention claimed is:

1. A polysilazane coating method for limiting fragmentation of polysilazane, the method comprising the steps of i) preparing a coating composition, wherein the preparation of the coating composition comprises the sub-steps of a. introducing a component A into a coating composition vessel;

b. introducing a component B into the coating composition vessel and mixing component B with component A, and c. introducing a component C into the coating composition vessel and mixing component C with components A and B;

wherein the components A, B, and C each are chosen from a group of polysilazanes, a group of catalysts, or a group of reactive nanomaterials and/or reactive molecules that can react spontaneously with a polysilazane polymer backbone to cause fragmentation;

wherein the components A, B, and C are all chosen from different groups;

wherein the choice of group for each of the components A, B and C are predetermined based on the known reactivity of the components towards each other;

ii) applying the coating composition to a substrate;

wherein step ii) is initiated at a predetermined time period $t_{ii}$ based on the known reactivity of the components towards each other;

wherein the predetermined time period $t_{ii}$ is chosen so that $1 \le t_{ii} \le 1200$ seconds;

wherein the introduction of component C in sub-step ic) is initiated a predetermined time period to $t_c$ after the introduction of component B in sub-step ib); and wherein $t_c$ is chosen so that $0 < t_c < 900$ seconds.

2. The method according to claim 1, wherein the group of catalysts comprises a catalyst for cross-linking polysilazane.

3. The method according to claim 1, wherein the method is performed using continuous flow.

4. The method according to claim 1, wherein step ii) is performed by ultrasonic spray coating or by roller coating.

5. The method according to claim 1, wherein step ii) is performed by roller coating.

6. The method according to claim 1, wherein coating formulation is diluted before the application in step ii).

7. The method according to claim 1, wherein the predetermined time periods $t_i$ and $t_{ii}$ do not exceed 300 seconds.

8. The method according to claim 1, wherein component A is chosen from the group of reactive nanomaterials and/or reactive molecules that can react spontaneously with a polysilazane polymer backbone to cause fragmentation, component B is chosen from the group of polysilazanes, and component C is chosen from the group of catalysts.

9. The method according to claim 1, wherein component A is chosen from the group of reactive nanomaterials and/or reactive molecules that can reach spontaneously with a polysilazane polymer backbone to cause fragmentation, component B is chosen from the group of catalysts, and component C is chosen from the group of polysilazanes.

10. The method according to claim 9, wherein component A and B are pre-mixed before introduction into the coating composition vessel.

11. The method according to claim 1, further comprising an additional sub-step ix) before or after any one of the sub-steps ia), ib), or ic).

12. An assembly for performing the method according to claim 1.

13. The assembly according to claim 12, comprising an elongate coating composition vessel having a first end and a second end, where the first and second ends are arranged opposite each other, the elongate coating composition vessel comprising a first inlet port, a second inlet port, arranged closer to the second end than the first inlet port, a third inlet port, arranged at a distance D from the second inlet port and closer to the second end than the second inlet port, and an applicator port, arranged at a distance D' from the third inlet port and closer to the second end than the third inlet port;

an applicator connected to the applicator port so that fluid connection is provided between the applicator and the elongated coating composition vessel; and a pressure generator, configured to generate a pressure, where the pressure generator is connected directly or indirectly to the first inlet port in order to create a pressure difference between the first inlet port and the applicator port.

14. The assembly according to claim 13, further comprising an additional pressure generator, configured to generate a pressure, where the second pressure generator is connected directly or indirectly to the second inlet port or the third inlet port in order to create a pressure difference between the second or third inlet port and the applicator port.

* * * * *